(12) United States Patent
Kitazoe et al.

(10) Patent No.: US 8,909,227 B2
(45) Date of Patent: Dec. 9, 2014

(54) HANDOVER TO ANY CELL OF A TARGET BASE STATION IN A WIRELESS COMMUNICATION SYSTEM

(75) Inventors: Masato Kitazoe, Tokyo (JP); Oronzo Flore, Ostuni (IT)

(73) Assignee: QUALCOMM Incorporated, San Diego, CA (US)

( * ) Notice: Subject to any disclaimer, the term of this patent is extended or adjusted under 35 U.S.C. 154(b) by 918 days.

(21) Appl. No.: 12/439,722

(22) PCT Filed: Oct. 2, 2007

(86) PCT No.: PCT/US2007/080202
§ 371 (c)(1),
(2), (4) Date: Jun. 8, 2009

(87) PCT Pub. No.: WO2008/042906
PCT Pub. Date: Apr. 10, 2008

(65) Prior Publication Data
US 2010/0178920 A1 Jul. 15, 2010

Related U.S. Application Data

(60) Provisional application No. 60/828,010, filed on Oct. 3, 2006, provisional application No. 60/828,186, filed on Oct. 4, 2006.

(51) Int. Cl.
*H04W 36/00* (2009.01)
*H04W 92/20* (2009.01)

(52) U.S. Cl.
CPC .......... *H04W 36/0055* (2013.01); *H04W 92/20* (2013.01)
USPC ............ 455/436; 455/437; 455/443; 370/331

(58) Field of Classification Search
CPC ..... H04W 8/183; H04W 36/30; H04W 36/04; H04W 36/18; H04W 36/32; H04W 36/0055
USPC ................ 455/432.1, 336–444; 370/328–342
See application file for complete search history.

(56) References Cited

U.S. PATENT DOCUMENTS 5,432,843 A * 7/1995 Bonta ............................ 455/438
6,278,881 B1 * 8/2001 Balck ............................ 455/444
(Continued)

FOREIGN PATENT DOCUMENTS

GB 2327013 1/1999
JP 2008502272 A 1/2008
(Continued)

OTHER PUBLICATIONS

Alcatel: "Proffer/Bid based Handover Preparation" (Online) Sep. 1, 2006, XP002472869.
(Continued)

*Primary Examiner* — Magdi Elhag
(74) *Attorney, Agent, or Firm* — Dalei Dong

(57) ABSTRACT

Techniques for performing handover of a user equipment (UE) in a cell-to-base station manner are described. The UE may receive a handover command to perform handover from a source base station to a target base station. The source base station may send context information for the UE to the target base station, and the context information may be available to all cells of the target base station. The UE may attempt handover from a serving cell of the source base station to a first cell of the target base station. The UE may attempt handover to a second cell of the target base station if the handover to the first cell fails. The UE may (i) receive the first and second cells from the source base station or (ii) receive only the first cell from the source base station and determine the second cell based on broadcast system information.

43 Claims, 10 Drawing Sheets

(56) References Cited

U.S. PATENT DOCUMENTS

| | | | |
|---|---|---|---|
| 6,687,237 B1* | 2/2004 | Lee et al. | 370/331 |
| 7,215,957 B2* | 5/2007 | Ekman et al. | 455/436 |
| 2002/0168982 A1* | 11/2002 | Sorokine et al. | 455/442 |
| 2004/0057402 A1* | 3/2004 | Ramos et al. | 370/329 |
| 2004/0085926 A1 | 5/2004 | Hwang et al. | |
| 2004/0185852 A1* | 9/2004 | Son et al. | 455/438 |
| 2004/0224690 A1 | 11/2004 | Choi et al. | |
| 2005/0197124 A1* | 9/2005 | Kang et al. | 455/439 |
| 2006/0126570 A1 | 6/2006 | Kim et al. | |
| 2007/0230600 A1* | 10/2007 | Bertrand et al. | 375/260 |
| 2008/0042096 A1 | 2/2008 | Park et al. | |
| 2008/0051086 A2* | 2/2008 | Etemad et al. | 455/436 |
| 2008/0076405 A1* | 3/2008 | Jen | 455/423 |
| 2008/0200173 A1* | 8/2008 | Dalsgaard | 455/436 |
| 2008/0268844 A1* | 10/2008 | Ma et al. | 455/436 |
| 2008/0273610 A1* | 11/2008 | Malladi et al. | 375/260 |
| 2008/0285500 A1* | 11/2008 | Zhang et al. | 370/315 |
| 2009/0252119 A1* | 10/2009 | Fischer et al. | 370/331 |

FOREIGN PATENT DOCUMENTS

| | | |
|---|---|---|
| JP | 2008530945 A | 8/2008 |
| KR | 20010108438 | 12/2001 |
| RU | 2263400 | 10/2005 |
| RU | 2267224 | 12/2005 |
| WO | WO0060891 | 10/2000 |
| WO | WO2005032190 A1 | 4/2005 |
| WO | WO2005086377 A1 | 9/2005 |

OTHER PUBLICATIONS

Evolved Universal Terrestrial Radio Access (E-UTRA) and Evolved Universal Terrestrial Radio Access Network (E-UTRAN); Radio interface protocol aspects (Release 7) (3GPP TR 25.813) Technical Report 3RD Generation Partnership Project (3GPP): Technical Repor.
Huawei: "LTE Handover preparation" (Online) Sep. 1, 2006, XP002472870.
Samsung: "Intra-LTE mobility in case of no handover preparation" (Online) Sep. 1, 2006, XP002472868.
International Search Report—PCT/US07/080202, International Search Authority—European Patent Office—Apr. 1, 2008.
Written Opinion—PCT/US071080202, International Search Authority-European Patent Office—Apr. 1, 2008.
Samsung: "Intra-LTE mobility in case of no handover preparation", 3GPP TSG-RAN2 Meeting #53bis R2-061828, Jun. 2006.
Samsung: "Intra-LTE mobility in case of no handover preparation," 3GPP TSG-RAN2 Meeting #55 R2-062828 Oct. 13, 2006 URL, http://ftp.3gpp.org/tsg_ran/WG2_RL2/TSGR2_55/Documents/R2-062828.zip.
3rd Generation Partnership Project, "Technical Specification Group Radio Access Network; Evolved UTRA and UTRAN; Radio Access Architecture and Interfaces (Release 7)", 3GPP TR R3.018, V0.6.0 (Oct. 2006).

* cited by examiner

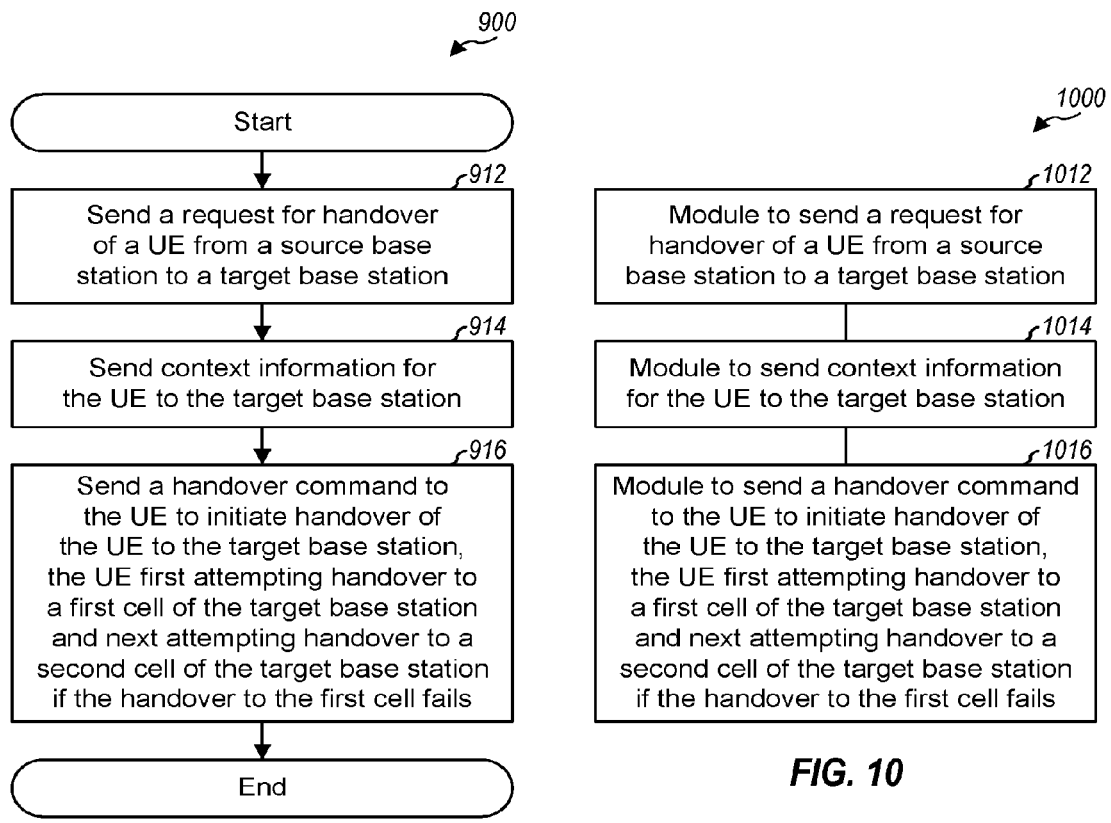

HANDOVER TO ANY CELL OF A TARGET BASE STATION IN A WIRELESS COMMUNICATION SYSTEM

The present application claims priority to provisional U.S. Application Ser. No. 60/828,010, filed Oct. 3, 2006, and provisional U.S. Application Ser. No. 60/828,186, filed Oct. 4, 2006, assigned to the assignee hereof and incorporated herein by reference.

BACKGROUND

I. Field

The present disclosure relates generally to communication, and more specifically to techniques for performing handover in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include any number of base stations that can support communication for any number of user equipments (UEs). Each base station may provide communication coverage for a particular geographic area. The overall coverage area of each base station may be partitioned into multiple (e.g., three) smaller areas. The term "cell" can refer to the smallest coverage area of a base station and/or a base station subsystem serving this coverage area.

A UE (e.g., a cellular phone) may communicate with a serving cell for a call. The UE may be mobile and may move from the coverage of the serving cell into the coverage of a new cell, which may be able to better serve the UE. The UE may perform handover from the serving cell to the new cell. The handover to the new cell may fail for various reasons. In this case, the UE may drop the connection with the serving cell and enter an idle state. The UE may then attempt to access a suitable cell in a normal manner (e.g., from scratch) in the idle state. However, having the UE enter the idle state in case of a handover failure may result in disruption of service, which may be undesirable.

SUMMARY

Techniques for performing handover of a UE in a cell-to-base station manner in order to improve handover reliability are described herein. The UE may receive a handover command to perform handover from a source base station to a target base station. As part of the handover, the source base station may send context information for the UE to the target base station, which may use the context information to serve the UE after the handover. The context information may be available to all cells of the target base station without requiring another context transfer from the source base station.

In one design, the UE may attempt handover from a serving cell of the source base station to a first cell of the target base station. The UE may attempt handover to a second cell of the target base station if the handover to the first cell of the target base station fails. In one design, the UE may receive the first and second cells from the source base station, e.g., via the handover command. In another design, the UE may receive only the first cell from the source base station and may determine the second cell based on system information (e.g., a neighbor cell list) broadcast by the source base station.

Various aspects and features of the disclosure are described in further detail below.

BRIEF DESCRIPTION OF THE DRAWINGS

FIGS. 9 and 10 show a process and an apparatus, respectively, for supporting handover of the UE by the source base station.

DETAILED DESCRIPTION

The handover techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA, E-UTRA and GSM are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, GSM, UMTS and LTE are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for LTE, and LTE terminology is used in much of the description below.

Figure 1:
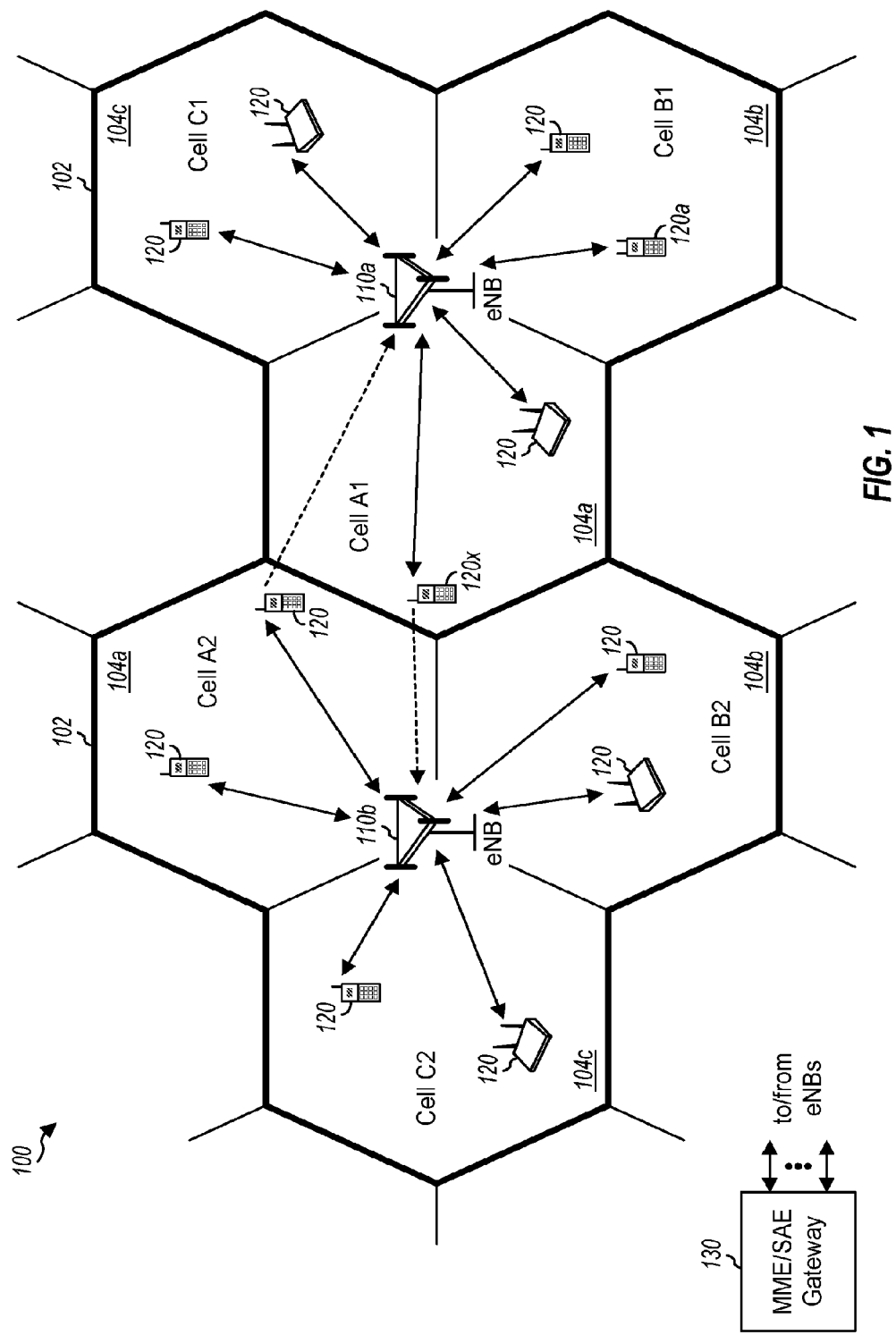
FIG. 1 shows a wireless multiple-access communication system.

FIG. 1 shows a wireless multiple-access communication system 100 with multiple evolved Node Bs (eNBs). For simplicity, only two eNBs 110a and 110b are shown in FIG. 1. An eNB may be a fixed station used for communicating with the UEs and may also be referred to as a Node B, a base station, an access point, etc. Each eNB 110 provides communication coverage for a particular geographic area 102. To improve system capacity, an eNB coverage area may be partitioned into multiple smaller areas, e.g., three smaller areas 104a, 104b and 104c. Each smaller area may be served by a respective eNB subsystem. In 3GPP, the term "cell" can refer to the smallest coverage area of an eNB and/or an eNB subsystem serving this coverage area. In other systems, the term "sector" can refer to the smallest coverage area and/or the subsystem serving this coverage area. For clarity, 3GPP concept of cell is used in the description below.

UEs 120 may be dispersed throughout the system. A UE may be stationary or mobile and may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with one or more eNBs via transmissions on the downlink and uplink. The downlink (or forward link) refers to the communication link from the eNBs to the UEs, and the uplink (or reverse link) refers to the communication link from the UEs to the eNBs. In FIG. 1, a solid line with double arrows indicates communication between a UE and an eNB. A broken line with a single arrow indicates a UE attempting handover to another eNB.

A Mobility Management Entity/System Architecture Evolution (MME/SAE) gateway 130 may couple to eNBs 110 and support communication for UEs 120. For example, MME/SAE gateway 130 may perform various functions such as distribution of paging messages to the eNBs, security control, idle state mobility control, SAE bearer control, ciphering and integrity protection of higher-layer signaling, termination of user plane packets for paging reasons, and switching of user plane for support of UE mobility. System 100 may include other network entities supporting other functions. The network entities in LTE are described in 3GPP TS 36.300, entitled "Evolved Universal Terrestrial Radio Access (E-UTRA) and Evolved Universal Terrestrial Radio Access Network (E-UTRAN); Overall description," March 2007, which is publicly available.

In the example shown in FIG. 1, eNB 110a has three cells A1, B1 and C1 that cover different geographic areas. eNB 110b also has three cells A2, B2 and C2 that cover different geographic areas. The cells of eNBs 110a and 110b may operate on the same frequency. For clarity, FIG. 1 shows the cells of the eNBs not overlapping one another. In a practical deployment, the adjacent cells of each eNB typically overlap one another at the edges. Furthermore, each cell of each eNB typically overlaps one or more other cells of one or more other eNBs at the edges. This overlapping of coverage edges may ensure that a UE can receive coverage from one or more cells at any location as the UE moves about the system.

Figure 2:
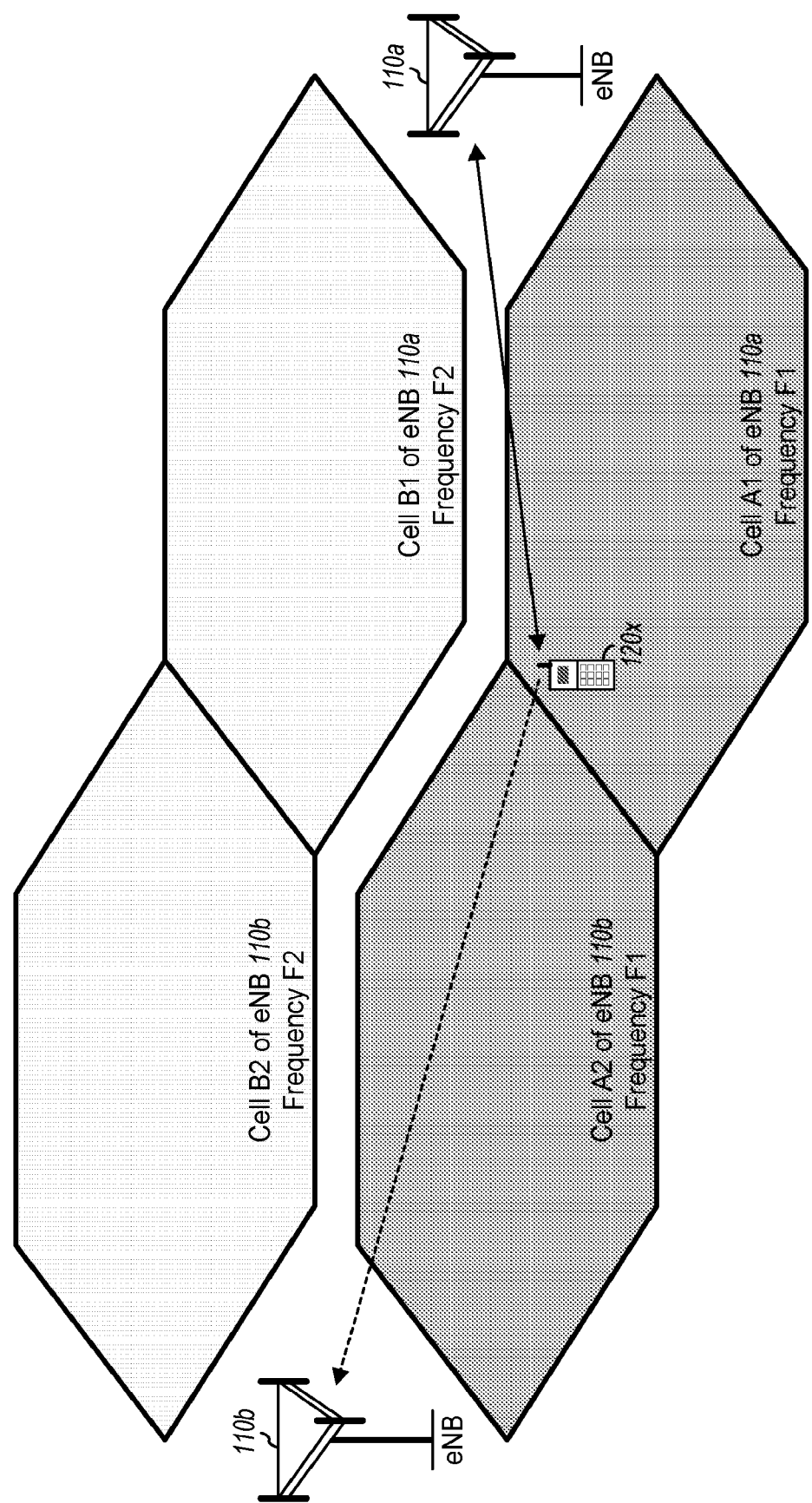
FIG. 2 shows a deployment of cells on two frequencies.

FIG. 2 shows another deployment of eNBs 110a and 110b. In the example shown in FIG. 2, eNB 110a has two cells A1 and B1 that operate on two frequencies F1 and F2, respectively, and have overlapping coverage areas. eNB 110b also has two cells A2 and B2 that operate on frequencies F1 and F2, respectively, and have overlapping coverage areas. Cells A1 and B1 may each overlap cells A2 and B2 at the edges, and cells A2 and B2 may each overlap cells A1 and B1 at the edges.

In general, an eNB may have any number of cells on any number of frequencies. Multiple cells may be deployed on different frequencies in a given geographic area to improve capacity. In this case, the UEs in the geographic area may be distributed among the cells on different frequencies in order to balance the load across these cells. In general, a UE may perform handover from a serving cell to any cell that can better serve the UE. The better cell may be on the same frequency as that of the serving cell or may be on a different frequency.

Figure 3:
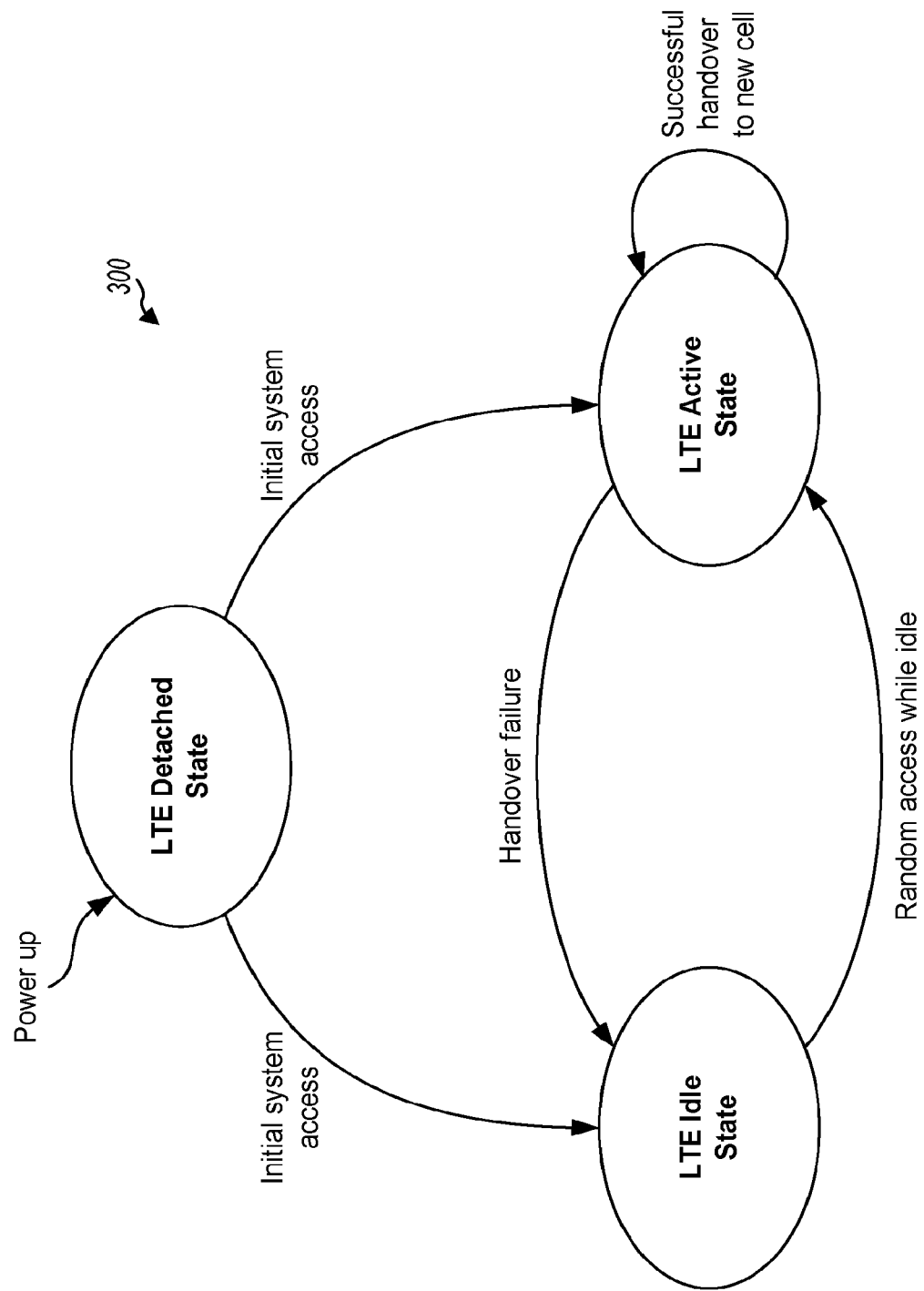
FIG. 3 shows a state diagram for a UE.

FIG. 3 shows a state diagram 300 for a UE in LTE. The UE may operate in one of several states such as LTE Detached, LTE Idle and LTE Active states. The UE may enter the LTE Detached state upon power up. In the LTE Detached state, the UE has not accessed the system and is not known by the system. The UE may perform initial system access and register with the system. The UE may then transition to either (i) the LTE Active state if the UE has data to exchange on the downlink or uplink or (ii) the LTE Idle state otherwise.

In the LTE Idle state, the UE and the system may have context information to allow the UE to quickly transition to the LTE Active state. While in the LTE Idle state, the UE may perform random access and transition to the LTE Active state when there is data to send or receive. In the LTE Active state, the UE may actively communicate with the system on the downlink and/or uplink. The UE may perform handover to a new cell whenever the UE moves outside the coverage of the serving cell. The UE may remain in the LTE Active state if the handover is successful and may transition back to the LTE Idle state if the handover fails. The UE may also transition between the various states in other manners.

The system may support network-initiated handover and/or UE-initiated handover. For network-initiated handover, a UE may perform handover whenever directed by the system, and the system may select a target cell for the UE to attempt handover, e.g., based on measurements made by the UE and sent to the serving cell. For UE-initiated handover, which is also referred to as forward handover, the UE may autonomously initiate handover to a target cell.

The UE may perform handover in a cell-to-cell manner from the serving cell to the target cell. For inter-eNB handover, the serving cell is served by a source eNB, and the target cell is served by a target eNB that is different from the source eNB. Prior to the inter-eNB handover, the source eNB may transfer context information for the UE to the target eNB to assist the target eNB in serving the UE after the handover.

The handover from the serving cell to the target cell may fail for various reasons. Since handover may be performed in a cell-to-cell manner, the UE may select a second target cell of a second target eNB in case of a handover failure to the original target cell. The UE may then try to re-establish connection via the second target cell. This handover behavior may be considered to be unnecessarily complicated since the context information for the UE may need to be transferred again from the source eNB to the second target eNB. To avoid this complication, the UE may drop the connection with the source eNB and enter the LTE Idle state. The UE may then attempt to access a suitable cell in a normal manner (e.g., from scratch) in the LTE Idle state. However, having the UE enter the LTE Idle state in case of a handover failure may result in disruption of service to the UE.

In an aspect, the UE may perform handover in a cell-to-eNB manner and may attempt handover to different cells of a target eNB in order to improve the likelihood of successful handover. The context information for the UE may be transferred from the source eNB to the target eNB via eNB-to-eNB communication. The context information may be readily transferred among different eNB subsystems serving different cells of the target eNB. Hence, the UE may be handed over to any cell of the target eNB without requiring another transfer of the context information by the source eNB. The cell-to-eNB handover techniques may thus increase robustness of handover procedure by allowing the UE to select any cell of the target eNB without incurring additional overhead for transfer of context information.

The UE may obtain a list of candidate cells of the target eNB, which are candidates for handover, in various manners. In one design, the source eNB may send the list of candidate cells to the UE, e.g., by including cell IDs of these cells in a Handover Command message sent to direct the UE to perform handover. The candidate cells may be geographically close to the serving cell for the UE. The candidate cells in the list may be ordered, e.g., starting with a cell to which handover is most likely to succeed and concluding with a cell to which handover is least likely to succeed. The UE may select one candidate cell at a time from the list to attempt handover, starting with the first cell in the list. Alternatively, the UE may select any candidate cell in the list to attempt handover, e.g., based on cell measurement results available at the UE. In general, the UE may autonomously select any candidate cell in the list and may perform UE-initiated handover to the selected cell. If the handover to the selected cell fails, then the UE may select another candidate cell in the list and attempt handover to this cell.

In another design, the UE may obtain the list of candidate cells of the target eNB from a neighbor cell list included in system information broadcast by the source eNB, the target eNB, or some other eNB. The neighbor cell list may include neighbor cells as well as information associating these cells to eNBs. For example, each cell in the neighbor cell list may be associated with a particular eNB ID. Alternatively, different eNBs may be assigned different set IDs, and each cell may be mapped to the set ID of the eNB to which that cell belongs.

In yet another design, the UE may obtain one or more lists of cells for one or more neighbor eNBs from a Measurement Control message sent by the source eNB. One of the neighbor eNBs may be selected as the target eNB based on cell measurements reported by the UE. The UE may then use the list of cells of the selected target eNB to attempt handover. The UE may also obtain the list of candidate cells of the target eNB in other manners.

In one design, the source eNB may provide (e.g., in the Handover Command message) the list of candidate cells of the target eNB to which the UE can attempt handover. In another design, the source eNB may provide one target cell of the target eNB to which the UE can attempt handover. The UE may autonomously attempt handover to other cells of the target eNB if handover to the target cell fails. In yet another design, the source eNB may provide one target cell of the target eNB to which the UE can attempt handover and an indication of whether or not UE-initiated handover is allowed. The UE may attempt handover to other cells of the target eNB if handover to the target cell fails and UE-initiated handover is allowed. The UE may also determine whether or not to initiate handover and/or which cells to attempt handover in other manners.

Figure 4:
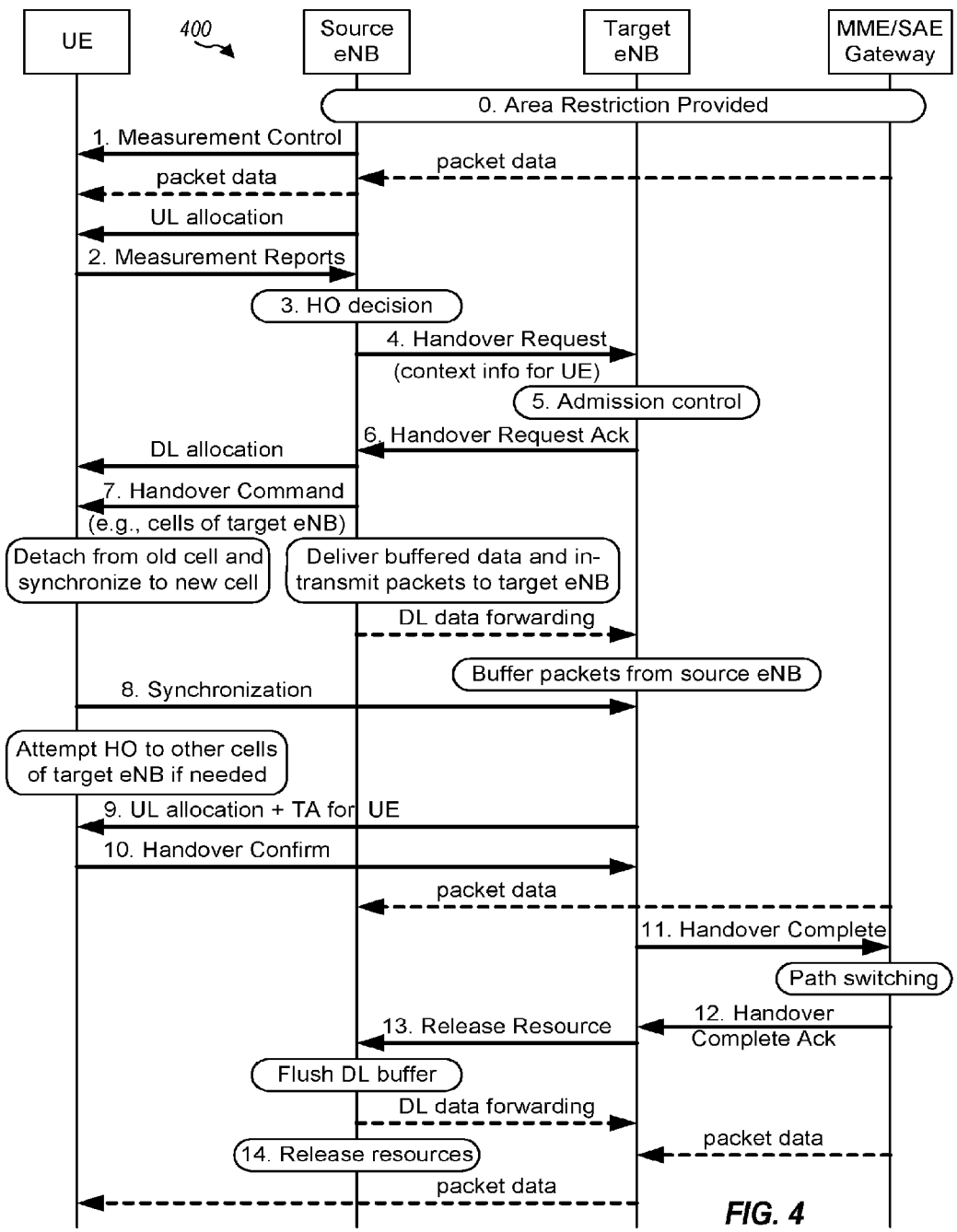
FIGS. 4, 5 and 6 show three message flows for handover of the UE from a source base station to any cell of a target base station.

FIG. 4 shows a design of a message flow 400 for inter-eNB handover of a UE from a serving cell of a source eNB to a cell of a target eNB, e.g., handover of UE 120x from cell A1 of source eNB 110a to a cell of target eNB 110b in FIG. 1 or 2. For clarity, only signaling and functions pertinent for handover of the UE is described below.

The UE may initially communicate with a serving cell (e.g., cell A1) of the source eNB. The source eNB may configure measurement procedures for the UE (step 1), and the UE may send measurement reports to the source eNB (step 2). The source eNB may make a decision to hand off the UE (step 3) and may issue a Handover Request message to the target eNB (step 4). The source eNB may send context information for the UE to the target eNB. The context information may include RRC context, SAE bearer context, and/or other information used to support communication for the UE. The target eNB may perform admission control and may accept the handover of the UE (step 5). The target eNB may then return a Handover Request Acknowledgement (Ack) to the source eNB (step 6).

The source eNB may then send a Handover Command to the UE (step 7). The Handover Command may include one or more candidate cells of the target eNB (e.g., cells A2 and B2 in FIG. 1 or 2) to which the UE may attempt handover. This Handover Command may also include other information such as configuration information (e.g., radio link configurations) for the target eNB. The UE may use the configuration information to send signaling to the target eNB.

The UE may then detach from the source eNB, select a candidate cell (e.g., cell A2) of the target eNB to attempt handover, and perform random access with the selected cell. For the random access, the UE may send a random access preamble on a Random Access Channel (RACH) to the selected cell to perform synchronization to this cell (step 8). The selected cell may not receive the random access preamble from the UE. Alternatively, the selected cell may receive the random access preamble and return a random access response, which may not be received by the UE. In either case, the UE may resend the random access preamble one or more additional times if the UE does not receive a random access response from the selected cell within a particular time period. The UE may declare a handover failure for the selected cell if the UE does not receive a random access response after sending the random access preamble a particular number of times. After declaring handover failure, the UE may select another candidate cell (e.g., cell B2) of the target eNB and may perform random access with this cell. The UE may repeat selecting another candidate cell of the target eNB and performing random access with the selected cell until either (i) a random access response is received from the selected cell or (ii) all candidate cells of the target eNB have been selected. The UE may receive a random access response from a candidate cell (e.g., cell A2 or B2) of the target eNB. The random access response may include information such as uplink (UL) resource allocation and timing advance for the UE and possibly other information.

Upon successfully accessing a candidate cell (e.g., cell A2 or B2) of the target eNB, the UE may send a Handover Confirm message to this cell to indicate that the handover procedure is completed for the UE (step 10). The target eNB may send a Handover Complete message to inform the MME/SAE gateway that the UE has changed eNB (step 11). The MME/SAE gateway may then switch a data path for the UE from the source eNB to the target eNB. The MME/SAE gateway may also return a Handover Complete Ack message to the target eNB (step 12). The target eNB may send a Release Resource message to the source eNB to indicate successful handover of the UE (step 13). Upon reception of the Release Resource message, the source eNB may release resources for the UE (step 14).

Each eNB may have a protocol stack that may include Non-Access Stratum (NAS), Radio Resource Control (RRC), Medium Access Control (MAC), physical layer (PHY), etc. NAS may perform functions such as SAE bearer management, authentication, mobility handling and paging origination for idle UEs, and security control. RRC may perform functions such as broadcast, paging, RRC connection management, radio bearer control, mobility functions, and UE measurement reporting and control. MAC may perform functions such as mapping between logical and transport channels, multiplexing and demultiplexing of data, and HARQ. PHY may perform functions to exchange data over the air. RRC is part of Layer 3 (L3), RLC and MAC are part of Layer 2 (L2), and PHY is part of Layer 1 (L1).

Figure 5:
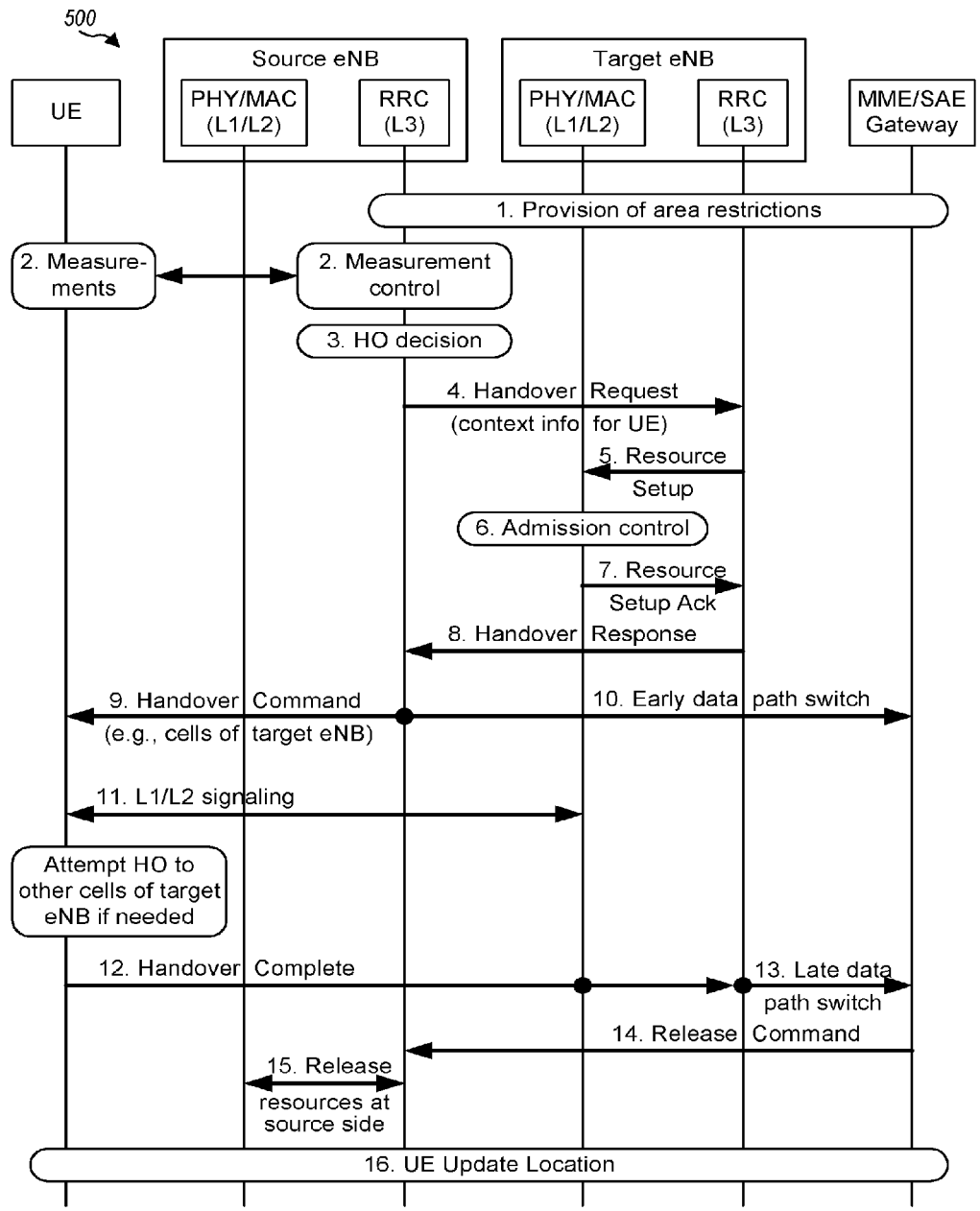

FIG. 5 shows a design of a message flow 500 for inter-eNB handover of a UE from a serving cell of a source eNB to a cell of a target eNB, e.g., handover of UE 120x from cell A1 of source eNB 110*a* to a cell of target eNB 110*b* in FIG. 1 or 2. FIG. 5 shows the PHY/MAC (L1/L2) and RRC (L3) as separate entities for each eNB. FIG. 5 also shows the signaling exchanged between the UE and the L1/L2 and L3 entities at the source and target eNBs for handover.

The UE may initially communicate with a serving cell (e.g., cell A1) of the source eNB. The source eNB may configure measurement procedures for the UE, and the UE may send measurement reports to the source eNB (step 2). The source eNB may make a decision to hand off the UE (step 3) and may send a Handover Request message and context information for the UE to the target eNB (step 4). RRC at the target eNB may send a Resource Setup message to L1/L2 at the target eNB (step 5), which may perform admission control (step 6) and respond with a Resource Setup Ack (step 7). RRC at the target eNB may then return a Handover Response to the source eNB (step 8).

The source eNB may then send a Handover Command to the UE (step 9). The Handover Command may include one or more candidate cells of the target eNB (e.g., cells A2 and B2 in FIG. 1 or 2) to which the UE may attempt handover. The UE may select one of the candidate cells (e.g., cell A2) of the target eNB and may perform random access with the selected cell (step 11). For step 11, the UE may send a random access preamble to the selected cell. The selected cell may respond by sending a random access response to the UE. The UE may not receive the random access response from this selected cell. The UE may then select another candidate cell (e.g., cell B2) of the target eNB and may perform random access with this cell. Upon successfully accessing a candidate cell (e.g., cell A2 or B2) of the target eNB, the UE may send a Handover Complete message to this cell (step 12).

The MME/SAE gateway may receive a message to switch data path for the UE from either the source eNB (step 10) or the target eNB (step 13). The MME/SAE gateway may then switch the data path for the UE from the source eNB to the target eNB and may return a Release Command to the source eNB (step 14). At the source eNB, RRC may inform L1/L2 to release resources for the UE (step 15).

Figure 6:
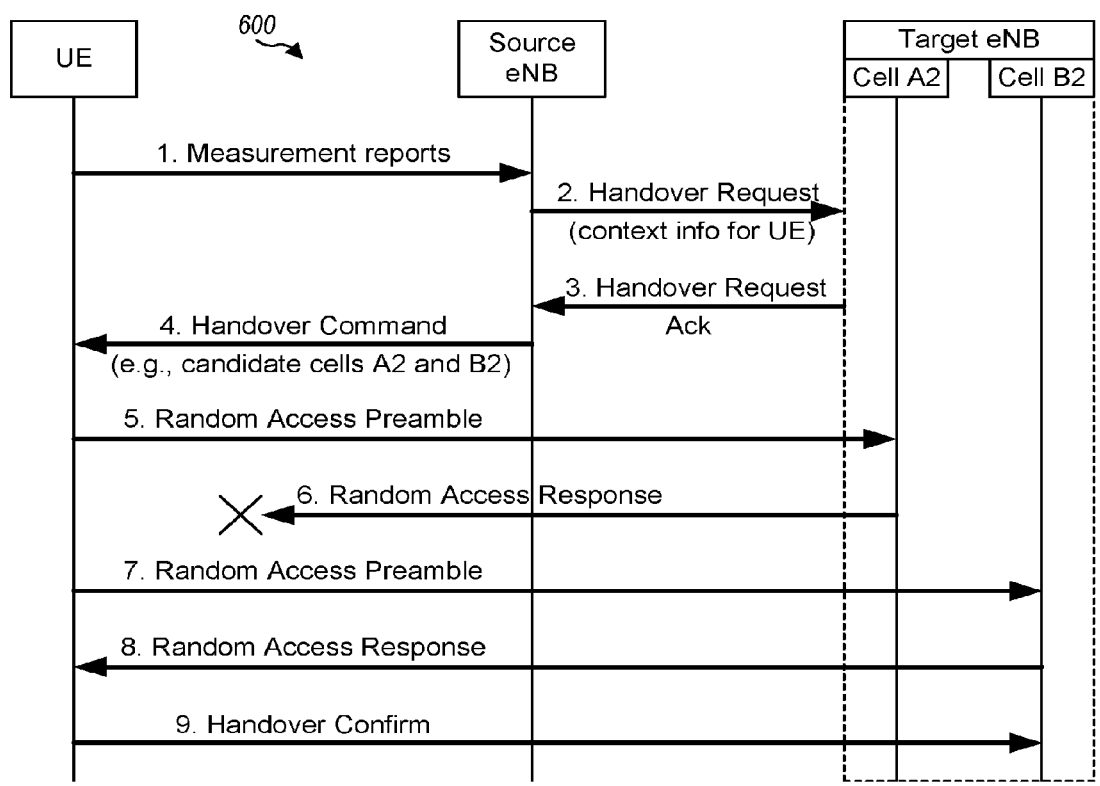

FIG. 6 shows a design of a message flow 600 for inter-eNB handover of a UE from a serving cell of a source eNB to a cell of a target eNB. Message flow 600 may be a stand-alone message flow or may be part of message flow 400 in FIG. 4 or message flow 500 in FIG. 5.

The UE may initially communicate with a serving cell (e.g., cell A1) of the source eNB. The UE may send measurement reports to the source eNB (step 1). The source eNB may make a decision to hand off the UE and may send a Handover Request message with context information for the UE to the target eNB (step 2). The target eNB may accept the handover and return a Handover Request Ack to the source eNB (step 3). The source eNB may then send a Handover Command with a list of candidate cells (e.g., cells A2 and B2) of the target eNB to the UE (step 4).

The UE may select one candidate cell in the list (e.g., cell A2) to attempt handover. The UE may perform random access with the selected cell and may send a random access preamble to this cell (step 5). The selected cell may receive the random access preamble and respond by sending a random access response, which may be decoded in error by the UE for various reasons (step 6). Alternatively, the random access preamble sent by the UE may be decoded in error by the selected cell, which would then not return a random access response. In either case, the handover attempt to the selected cell fails.

The UE may then select another candidate cell in the list (e.g., cell B2) to attempt handover. The UE may perform random access with the selected cell and may send a random access preamble to this cell (step 7). The selected cell may receive the random access preamble and respond by sending a random access response, which may be decoded correctly by the UE (step 8). The UE may then send a Handover Confirm message to the target eNB to indicate that the handover procedure is completed for the UE (step 9). The UE may thereafter communicate with this cell of the target eNB.

The UE may attempt handover to cell B2 of the target eNB if handover to cell A2 fails, as shown in FIG. 6. The UE may also directly attempt handover to cell B2 if the UE has information indicating that cell B2 is the better cell.

FIGS. 4 through 6 show some example message flows for inter-eNB handover. In general, inter-eNB handover may be performed based on any message flow and with any set of messages. In the designs shown in FIGS. 4 through 6, the UE may attempt UE-initiated handover to different cells of the target eNB. In other designs, the cells of the target eNB may initiate handover of the UE. For example, in response to receiving the Handover Request from the source eNB, the target eNB may direct one cell at a time to initiate handover of the UE, e.g., by sending a message to the UE and monitoring for a response from the UE.

Handover to any cell of the target eNB may be simpler than handover to a cell of another eNB because of the following:

Cells of a given eNB typically have the same capability and employ the same operational parameters. Thus, radio link configurations in the Handover Command may be used for any cell of the same eNB.

Resources are typically shared among the cells of a given eNB. Thus, if the target eNB accepts the handover of the UE in the preparation phase, then the target eNB will likely be able to serve the UE in any of the cells of the target eNB.

Handover to any cell of the target eNB does not require an additional data path switch on an S1 interface between the eNB and the MME/SAE gateway.

In other designs, the source eNB may provide candidate cells of the source eNB to which the UE may attempt handover. The candidate cells of the source eNB may provide the UE with more freedom in autonomously selecting a target cell for handover and may improve handover reliability. The UE may select a target cell from among the candidate cells of the source and target eNBs based on various criteria. In one design, the UE with may select the candidate cell with the best measurements to attempt handover. In another design, the UE may attempt handover to all candidate cells of the target eNB prior to attempting handover to candidate cells of the source eNB. In yet another design, the UE may attempt handover to all candidate cells of the source eNB prior to attempting handover to candidate cells of the target eNB. In any case, performing handover to another cell of the source eNB does not increase complexity in terms of UE context handling since the context information is already present in the source eNB. Furthermore, the resources for the UE are typically not released by the source eNB until the handover procedure is completed, as shown in FIGS. 4 and 5.

The handover techniques described herein exploit the fact that UE context transfer is eNB-to-eNB communication while handover is cell-to-cell mobility procedure. The UE may thus be allowed to perform handover to any cell of the target eNB and/or any cell of the source eNB since this does not require an additional UE context transfer. The techniques may improve handover reliability without incurring additional overhead for UE context transfer.

Figure 7:
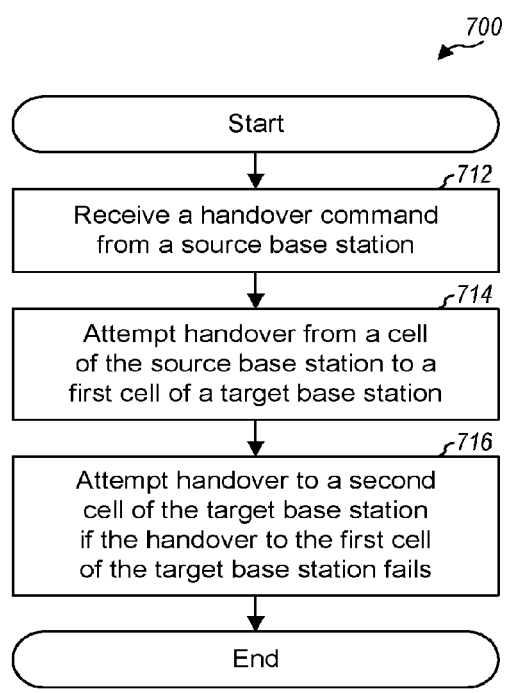
FIGS. 7 and 8 show a process and an apparatus, respectively, for performing handover by the UE.

FIG. 7 shows a design of a process 700 for performing handover by a UE. The UE may receive a handover command from a source base station (block 712). The UE may attempt handover from a cell of the source base station to a first cell of a target base station (block 714). The UE may attempt handover to a second cell of the target base station if the handover to the first cell of the target base station fails (block 716). The source base station may transfer context information for the UE to the target base station for the handover. The context information may be available to both the first and second cells of the target base station, without requiring another context transfer from the source base station.

For blocks 714 and 716, the UE may send a first random access preamble to the first cell of the target base station to attempt handover to this cell. The UE may determine that the handover to the first cell failed if a random access response is not received from this cell. The UE may send a second random access preamble to the second cell of the target base station to attempt handover to this cell. The UE may receive configuration information (e.g., radio link configurations) for the target base station from the source base station (e.g., in the handover command). The UE may use the configuration information to send the random access preambles and/or other signaling to the first and second cells.

In one design, the UE may receive the first and second cells of the target base station from the source base station, e.g., via the handover command or a measurement control message. In another design, the UE may receive only the first cell from the source base station and may determine the second cell based on system information (e.g., a neighbor cell list) broadcast by the source base station. In another design, the UE may receive a list of candidate cells of the target base station from the source base station and may select the first and second cells from this list of candidate cells, e.g., based on measurements made by the UE. The first and second cells may cover different geographic areas, e.g., as shown in FIG. 1. Alternatively, the first and second cells may operate on different frequencies and have overlapping coverage area, e.g., as shown in FIG. 2.

The UE may transition to an idle state if the handover to the second cell fails and no other cells of the target base station are available to attempt handover. The UE may also attempt handover to another cell of the source base station if the handover to the second cell fails.

Figure 8:
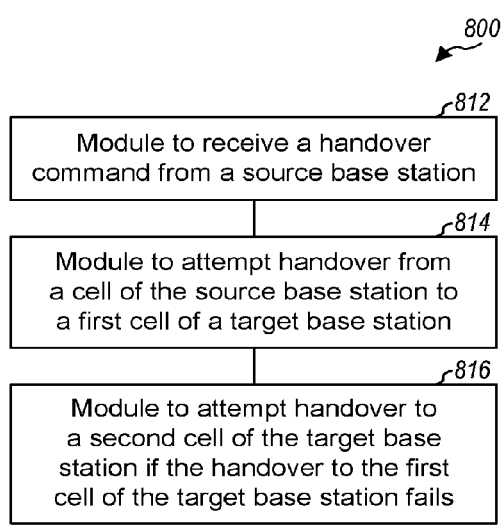

FIG. 8 shows a design of an apparatus 800 for performing handover. Apparatus 800 includes means for receiving a handover command from a source base station (module 812), means for attempting handover from a cell of the source base station to a first cell of a target base station (module 814), and means for attempting handover to a second cell of the target base station if the handover to the first cell of the target base station fails (module 816).

FIG. 9 shows a design of a process 700 for supporting handover of a UE by a source base station. The source base station may send a request for handover of the UE to a target base station (block 912) and may also send context information for the UE to the target base station (block 914). The source base station may send a handover command to the UE to initiate handover of the UE to the target base station (block 916). The UE may first attempt handover to a first cell of the target base station and may next attempt handover to a second cell of the target base station if the handover to the first cell fails.

The source base station may send to the UE a measurement control message that may include a list of cells of the target base station. The source base station may receive measurements made by the UE based on the measurement control message and may select the target base station based on the measurements. The source base station may send the first and second cells or only the first cell of the target base station in the handover command to the UE. The source base station may also send configuration information for the target base station to the UE. The source base station may broadcast a neighbor cell list that may include cells of the target base station.

FIG. 10 shows a design of an apparatus 1000 for supporting handover of a UE by a source base station. Apparatus 1000 includes means for sending a request for handover of the UE to a target base station (module 1012), means for sending context information for the UE to the target base station (module 1014), and means for sending a handover command to the UE to initiate handover of the UE to the target base station, where the UE may first attempt handover to a first cell of the target base station and may next attempt handover to a second cell of the target base station if the handover to the first cell fails (module 1016).

Figures 11, 12:
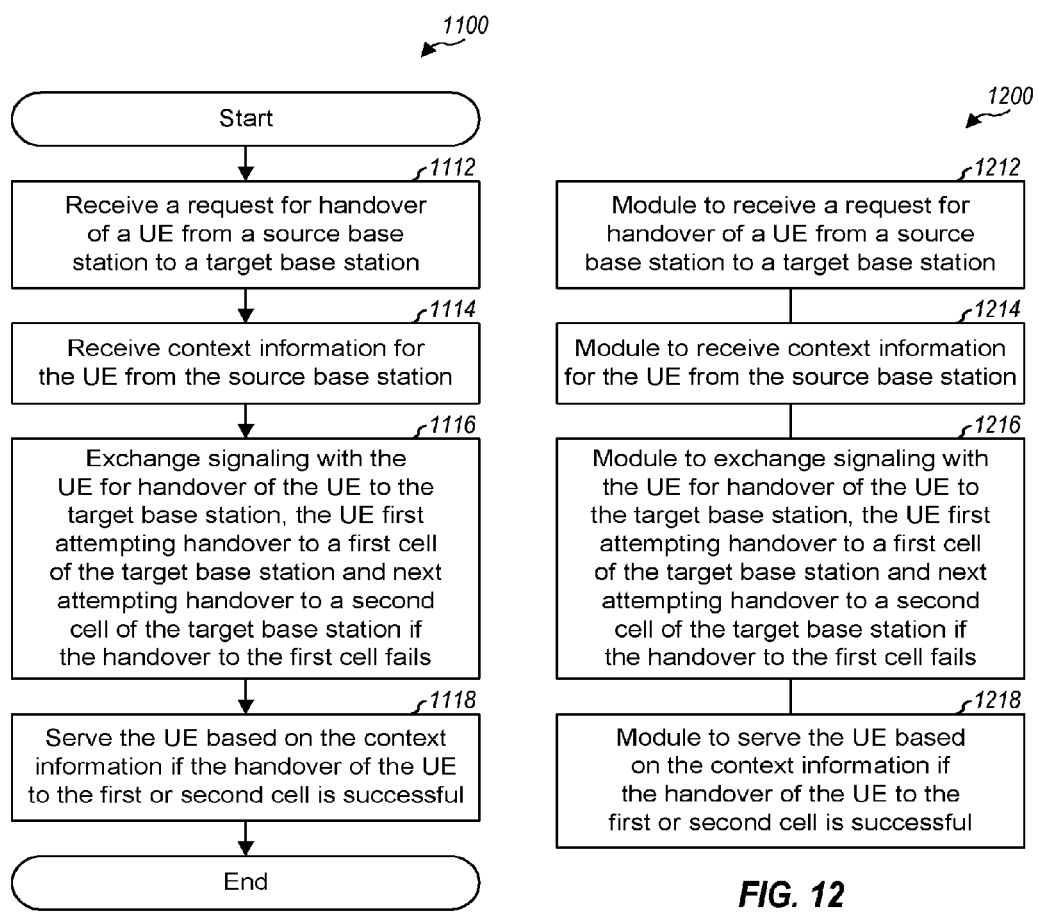
FIGS. 11 and 12 show a process and an apparatus, respectively, for supporting handover of the UE by the target base station.

FIG. 11 shows a design of a process 1100 for supporting handover of a UE by a target base station. The target base station may receive a request for handover of the UE from a source base station to the target base station (block 1112). The target base station may also receive context information for the UE from the source base station (block 1114). The target base station may exchange signaling with the UE for handover of the UE to the target base station (block 1116). The UE may first attempt handover to a first cell of the target base station and may next attempt handover to a second cell of the target base station if the handover to the first cell fails. The target base station may serve the UE based on the context information if the handover of the UE to the first or second cell is successful (block 1118).

The target base station may receive a first random access preamble from the UE at the first cell and may send a first random access response to the UE from the first cell. The first random access response may be decoded in error by the UE. The target base station may receive a second random access preamble from the UE at the second cell and may send a second random access response to the UE from the second cell. Alternatively, the target base station may decode in error the first random access preamble sent by the UE to the first cell, decode correctly the second random access preamble sent by the UE to the second cell, and send the random access response to the UE from the second cell.

FIG. 12 shows a design of an apparatus 1200 for supporting handover of a UE by a target base station. Apparatus 1200 includes means for receiving a request for handover of the UE from a source base station to the target base station (module 1212), means for receiving context information for the UE from the source base station (module 1214), means for exchanging signaling with the UE for handover of the UE to the target base station, where the UE may first attempt handover to a first cell of the target base station and may next attempt handover to a second cell of the target base station if the handover to the first cell fails (module 1216), and means for serving the UE based on the context information if the handover of the UE to the first or second cell is successful (module 1218).

The modules in FIGS. 8, 10 and 12 may comprise processors, electronics devices, hardware devices, electronics components, logical circuits, memories, etc., or any combination thereof.

Figure 13:
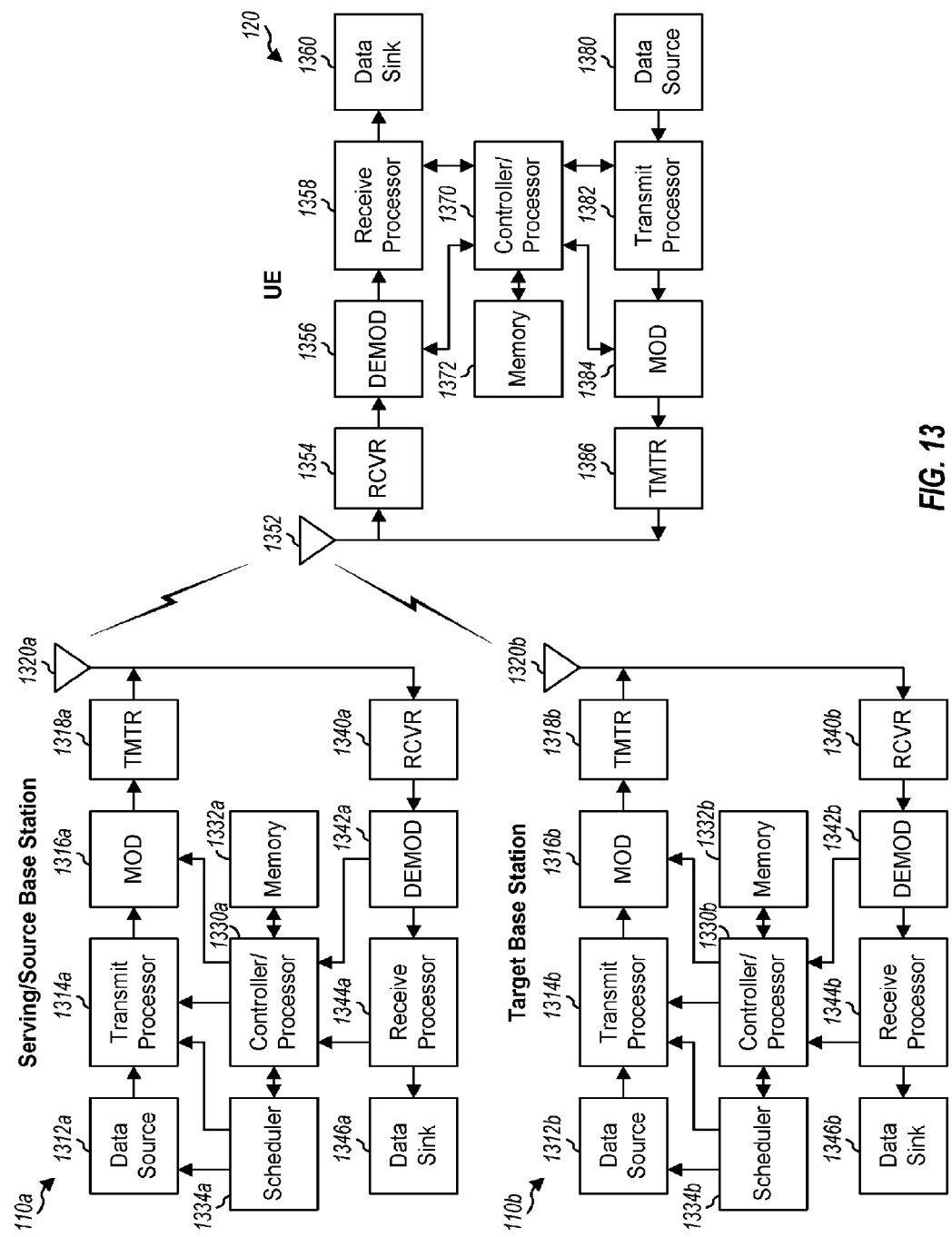
FIG. 13 shows a block diagram of the UE and two base stations.

FIG. 13 shows a block diagram of a design of a UE 120, serving/source base station 110*a*, and target base station 110*b*. At base station 110*a*, a transmit processor 1314*a* may receive traffic data from a data source 1312*a* and signaling from a controller/processor 1330*a* and a scheduler 1334*a*. For example, controller/processor 1330*a* may provide messages for handover of UE 120. Scheduler 1334*a* may provide an assignment of downlink and/or uplink resources for UE 120. Transmit processor 1314a may process (e.g., encode, interleave, and symbol map) the traffic data, signaling, and pilot and provide data symbols, signaling symbols, and pilot symbols, respectively. A modulator (MOD) 1316a may perform modulation (e.g., for OFDM) on the data, signaling, and pilot symbols and provide output chips. A transmitter (TMTR) 1318a may conditions (e.g., convert to analog, amplify, filter, and upconvert) the output chips and generate a downlink signal, which may be transmitted via an antenna 1320a.

Base station 110b may similarly process traffic data and signaling for the UEs served by base station 110b. The traffic data, signaling, and pilot may be processed by a transmit processor 1314b, modulated by a modulator 1316b, conditioned by a transmitter 1318b, and transmitted via an antenna 1320b.

At UE 120, an antenna 1352 may receive the downlink signals from base stations 110a and 110b and possibly other base stations. A receiver (RCVR) 1354 may condition (e.g., filter, amplify, downconvert, and digitize) a received signal from antenna 1352 and provide samples. A demodulator (DEMOD) 1356 may perform demodulation (e.g., for OFDM) on the samples and provide symbol estimates. A receive processor 1358 may process (e.g., symbol demap, deinterleave, and decode) the symbol estimates, provide decoded data to a data sink 1360, and provide decoded signaling to a controller/processor 1370.

On the uplink, a transmit processor 1382 may receive and process traffic data from a data source 1380 and signaling (e.g., for random access, handover, etc.) from controller/processor 1370. A modulator 1384 may perform modulation (e.g., for SC-FDM) on the symbols from processor 1382 and provide output chips. A transmitter 1386 may condition the output chips and generate an uplink signal, which may be transmitted via antenna 1352. At each base station, the uplink signals from UE 120 and other UEs may be received by antenna 1320, conditioned by a receiver 1340, demodulated by a demodulator 1342, and processed by a receive processor 1344. Processor 1344 may provide decoded data to a data sink 1346 and decoded signaling to controller/processor 1330.

Controllers/processors 1330a, 1330b and 1370 may direct the operation at base stations 110a and 110b and UE 120, respectively. Memories 1332a, 1332b and 1372 may store data and program codes for base stations 110a and 110b and UE 120, respectively. Schedulers 1334a and 1334b may schedule UEs for communication with base stations 110a and 110b, respectively, and may assign radio resources to the scheduled UEs.

The processors in FIG. 13 may perform various functions for the handover techniques described herein. For example, the processors at UE 120 may perform process 700 in FIG. 7, the processing for the UE in message flows 400, 500 and 600, and/or other processes for the techniques described herein. The processors at source base station 110a may perform process 900 in FIG. 9, the processing for the source eNB in message flows 400, 500 and 600, and/or other processes for the techniques described herein. The processors at target base station 110b may perform process 1100 in FIG. 11, the processing for the target eNB in message flows 400, 500 and 600, and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
   at least one processor configured to:
      initiate handover of a user equipment (UE) from a cell of a source base station to a first cell of a target base station, and
      initiate handover to a second cell of the target base station if the handover to the first cell of the target base station fails, wherein the first cell and the second cell are both served by the target base station, wherein context information for the UE is transferred from the source base station to the target base station for the handover, and wherein the context information is available to both the first and second cells of the target base station; and
   a memory coupled to the at least one processor.

2. The apparatus of claim 1, wherein the at least one processor is configured to send a first random access preamble to the first cell of the target base station to initiate handover to the first cell, and to send a second random access preamble to the second cell of the target base station to initiate handover to the second cell.

3. The apparatus of claim 2, wherein the at least one processor is configured to determine that the handover to the first cell of the target base station failed if a random access response is not received from the first cell.

4. The apparatus of claim 1, wherein the at least one processor is configured to receive information regarding the first and second cells of the target base station from the source base station.

5. The apparatus of claim 1, wherein the at least one processor is configured to receive information regarding the first cell of the target base station from the source base station, and to determine the second cell of the target base station based on system information broadcast by the source base station.

6. The apparatus of claim 1, wherein the at least one processor is configured to receive a list of candidate cells of the target base station from the source base station, and to select the first and second cells from the list of candidate cells.

7. The apparatus of claim 1, wherein the at least one processor is configured to first select the first cell based on measurements for cells of the target base station, and to next select the second cell based on the measurements.

8. The apparatus of claim 1, wherein the at least one processor is configured to receive configuration information for the target base station from the source base station, and to use the configuration information to send signaling to initiate handover to each cell of the target base station.

9. The apparatus of claim 1, wherein the first and second cells of the target base station cover different geographic areas.

10. The apparatus of claim 1, wherein the first and second cells of the target base station operate on different frequencies and have overlapping coverage area.

11. The apparatus of claim 1, wherein the at least one processor is configured to transition to an idle state if the handover to the second cell of the target base station fails and no other cells of the target base station are available to initiate handover.

12. The apparatus of claim 1, wherein the at least one processor is configured to initiate handover to another cell of the source base station if the handover to the second cell of the target base station fails.

13. A method for wireless communication, comprising:
    initiating handover of a user equipment (UE) from a cell of a source base station to a first cell of a target base station; and
    initiating handover to a second cell of the target base station if the handover to the first cell of the target base station fails, wherein the first cell and the second cell are both served by the target base station, wherein context information for the UE is transferred from the source base station to the target base station for the handover, and wherein the context information is available to both the first and second cells of the target base station.

14. The method of claim 13, wherein the initiating handover to the first cell comprises sending a first random access preamble to the first cell of the target base station to initiate handover to the first cell, and wherein the initiating handover to the second cell comprises sending a second random access preamble to the second cell of the target base station to initiate handover to the second cell.

15. The method of claim 13, further comprising:
    receiving information regarding the first and second cells of the target base station from the source base station.

16. The method of claim 13, further comprising:
    receiving information regarding the first cell of the target base station from the source base station; and
    determining the second cell of the target base station based on system information broadcast by the source base station.

17. An apparatus for wireless communication, comprising:
    means for initiating handover of a user equipment (UE) from a cell of a source base station to a first cell of a target base station; and
    means for initiating handover to a second cell of the target base station if the handover to the first cell of the target base station fails, wherein the first cell and the second cell are both served by the target base station, wherein context information for the UE is transferred from the source base station to the target base station for the handover, and wherein the context information is available to both the first and second cells of the target base station.

18. The apparatus of claim 17, wherein the means for initiating handover to the first cell comprises means for sending a first random access preamble to the first cell of the target base station to initiate handover to the first cell, and wherein the means for initiating handover to the second cell comprises means for sending a second random access preamble to the second cell of the target base station to initiate handover to the second cell.

19. The apparatus of claim 17, further comprising:
means for receiving information regarding the first and second cells of the target base station from the source base station.

20. The apparatus of claim 17, further comprising:
means for receiving information regarding the first cell of the target base station from the source base station; and
means for determining the second cell of the target base station based on system information broadcast by the source base station.

21. A non-transitory machine-readable medium comprising instructions which, when executed by a machine, cause the machine to perform operations including:
initiating handover of a user equipment (UE) from a cell of a source base station to a first cell of a target base station; and
initiating handover to a second cell of the target base station if the handover to the first cell of the target base station fails, wherein the first cell and the second cell are both served by the target base station, wherein context information for the UE is transferred from the source base station to the target base station for the handover, and wherein the context information is available to both the first and second cells of the target base station.

22. An apparatus for wireless communication, comprising:
at least one processor configured to:
send a request for handover of a user equipment (UE) from a source base station to a target base station,
send context information for the UE to the target base station, and
send a handover command to the UE to initiate handover of the UE to the target base station, the UE first initiating handover to a first cell of the target base station and next initiating handover to a second cell of the target base station if the handover to the first cell fails, wherein the first cell and the second cell are both served by the target base station, and wherein the context information for the UE is available to both the first and second cells of the target base station; and
a memory coupled to the at least one processor.

23. The apparatus of claim 22, wherein the at least one processor is configured to send information regarding the first and second cells of the target base station in the handover command to the UE.

24. The apparatus of claim 22, wherein the at least one processor is configured to send only information regarding the first cell of the target base station in the handover command to the UE, and to broadcast a neighbor cell list comprising cells of the target base station.

25. The apparatus of claim 22, wherein the at least one processor is configured to send configuration information for the target base station to the UE, the configuration information being used by the UE to send signaling to initiate handover to each cell of the target base station.

26. The apparatus of claim 22, wherein the at least one processor is configured to send a measurement control message comprising a list of cells of the target base station to the UE, to receive measurements made by the UE based on the measurement control message, and to select the target base station for handover of the UE based on the measurements.

27. A method for wireless communication, comprising:
sending a request for handover of a user equipment (UE) from a source base station to a target base station;
sending context information for the UE to the target base station; and
sending a handover command to the UE to initiate handover of the UE to the target base station, the UE first initiating handover to a first cell of the target base station and next initiating handover to a second cell of the target base station if the handover to the first cell fails, wherein the first cell and the second cell are both served by the target base station, and wherein the context information for the UE is available to both the first and second cells of the target base station.

28. The method of claim 27, further comprising:
sending information regarding the first and second cells of the target base station in the handover command to the UE.

29. The method of claim 27, further comprising:
sending only information regarding the first cell of the target base station in the handover command to the UE; and
broadcasting a neighbor cell list comprising cells of the target base station.

30. An apparatus for wireless communication, comprising:
at least one processor configured to:
receive a request for handover of a user equipment (UE) from a source base station to a target base station,
receive context information for the UE from the source base station,
exchange signaling with the UE for handover of the UE to the target base station, the UE first initiating handover to a first cell of the target base station and next initiating handover to a second cell of the target base station if the handover to the first cell fails, wherein the first cell and the second cell are both served by the target base station, and wherein the context information for the UE is available to both the first and second cells of the target base station, and
serve the UE based on the context information if the handover of the UE to the first or second cell is successful; and
a memory coupled to the at least one processor.

31. The apparatus of claim 30, wherein the at least one processor is configured to receive a first random access preamble from the UE at the first cell, to send a first random access response to the UE from the first cell, to receive a second random access preamble from the UE at the second cell, and to send a second random access response to the UE from the second cell.

32. The apparatus of claim 30, wherein the at least one processor is configured to decode in error a first random access preamble sent by the UE to the first cell, to decode correctly a second random access preamble sent by the UE to the second cell, and to send a random access response to the UE from the second cell.

33. A method for wireless communication, comprising:
receiving a request for handover of a user equipment (UE) from a source base station to a target base station;
receiving context information for the UE from the source base station;
exchanging signaling with the UE for handover of the UE to the target base station, the UE first initiating handover to a first cell of the target base station and next initiating handover to a second cell of the target base station if the handover to the first cell fails, wherein the first cell and the second cell are both served by the target base station, and wherein the context information for the UE is available to both the first and second cells of the target base station; and serving the UE based on the context information if the handover of the UE to the first or second cell is successful.

34. The method of claim 33, wherein the exchanging signaling with the UE for handover comprises
receiving a first random access preamble from the UE at the first cell,
sending a first random access response to the UE from the first cell,
receiving a second random access preamble from the UE at the second cell, and
sending a second random access response to the UE from the second cell.

35. The method of claim 33, wherein the exchanging signaling with the UE for handover comprises
decoding in error a first random access preamble sent by the UE to the first cell,
decoding correctly a second random access preamble sent by the UE to the second cell, and
sending a random access response to the UE from the second cell.

36. An apparatus for wireless communication, comprising:
means for sending a request for handover of a user equipment (UE) from a source base station to a target base station;
means for sending context information for the UE to the target base station; and
means for sending a handover command to the UE to initiate handover of the UE to the target base station, the UE first initiating handover to a first cell of the target base station and next initiating handover to a second cell of the target base station if the handover to the first cell fails, wherein the first cell and the second cell are both served by the target base station, and wherein the context information for the UE is available to both the first and second cells of the target base station.

37. The apparatus of claim 36, further comprising:
means for sending information regarding the first and second cells of the target base station in the handover command to the UE.

38. The apparatus of claim 36, further comprising:
means for sending only information regarding the first cell of the target base station in the handover command to the UE; and
means for broadcasting a neighbor cell list comprising cells of the target base station.

39. A non-transitory machine-readable medium comprising instructions which, when executed by a machine, cause the machine to perform operations including:
sending a request for handover of a user equipment (UE) from a source base station to a target base station;
sending context information for the UE to the target base station; and
sending a handover command to the UE to initiate handover of the UE to the target base station, the UE first initiating handover to a first cell of the target base station and next initiating handover to a second cell of the target base station if the handover to the first cell fails, wherein the first cell and the second cell are both served by the target base station, and wherein the context information for the UE is available to both the first and second cells of the target base station.

40. An apparatus for wireless communication, comprising:
means for receiving a request for handover of a user equipment (UE) from a source base station to a target base station;
means for receiving context information for the UE from the source base station;
means for exchanging signaling with the UE for handover of the UE to the target base station, the UE first initiating handover to a first cell of the target base station and next initiating handover to a second cell of the target base station if the handover to the first cell fails, wherein the first cell and the second cell are both served by the target base station, and wherein the context information for the UE is available to both the first and second cells of the target base station; and
means for serving the UE based on the context information if the handover of the UE to the first or second cell is successful.

41. The apparatus of claim 40, wherein the means for exchanging signaling with the UE for handover comprises
means for receiving a first random access preamble from the UE at the first cell,
means for sending a first random access response to the UE from the first cell,
means for receiving a second random access preamble from the UE at the second cell, and
means for sending a second random access response to the UE from the second cell.

42. The apparatus of claim 40, wherein the means for exchanging signaling with the UE for handover comprises
means for decoding in error a first random access preamble sent by the UE to the first cell,
means for decoding correctly a second random access preamble sent by the UE to the second cell, and
means for sending a random access response to the UE from the second cell.

43. A non-transitory machine-readable medium comprising instructions which, when executed by a machine, cause the machine to perform operations including:
receiving a request for handover of a user equipment (UE) from a source base station to a target base station;
receiving context information for the UE from the source base station;
exchanging signaling with the UE for handover of the UE to the target base station, the UE first initiating handover to a first cell of the target base station and next initiating handover to a second cell of the target base station if the handover to the first cell fails, wherein the first cell and the second cell are both served by the target base station, and wherein the context information for the UE is available to both the first and second cells of the target base station; and
serving the UE based on the context information if the handover of the UE to the first or second cell is successful.

* * * * *